June 1, 1943. F. F. HUTCHINSON 2,320,602
ALTERNATOR AND CONTROL SYSTEM THEREFOR
Filed June 15, 1940  4 Sheets-Sheet 1
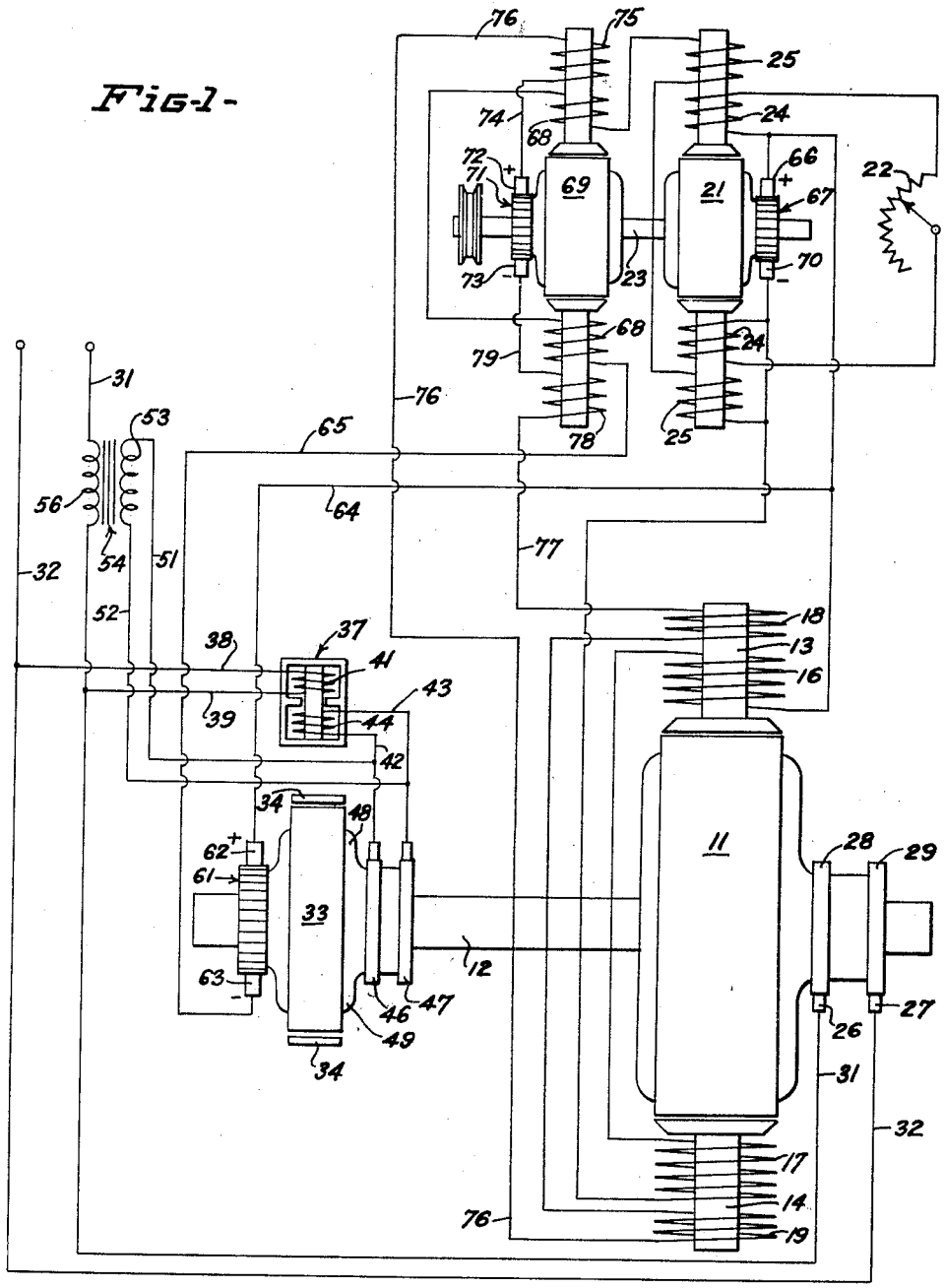
Fig-1-
INVENTOR.
FENTON F. HUTCHINSON
BY
ATTORNEY.

June 1, 1943.     F. F. HUTCHINSON     2,320,602
ALTERNATOR AND CONTROL SYSTEM THEREFOR
Filed June 15, 1940     4 Sheets-Sheet 2
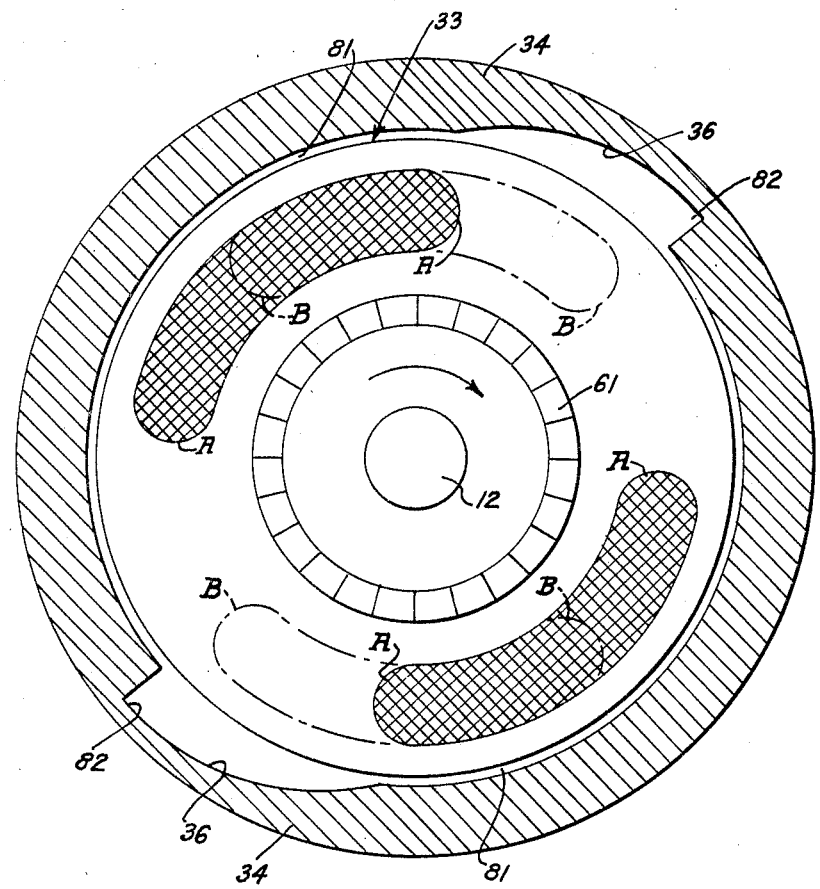
Fig-2-
INVENTOR.
FENTON F. HUTCHINSON
BY Arlington White
ATTORNEY.

June 1, 1943.   F. F. HUTCHINSON   2,320,602
ALTERNATOR AND CONTROL SYSTEM THEREFOR
Filed June 15, 1940   4 Sheets-Sheet 3
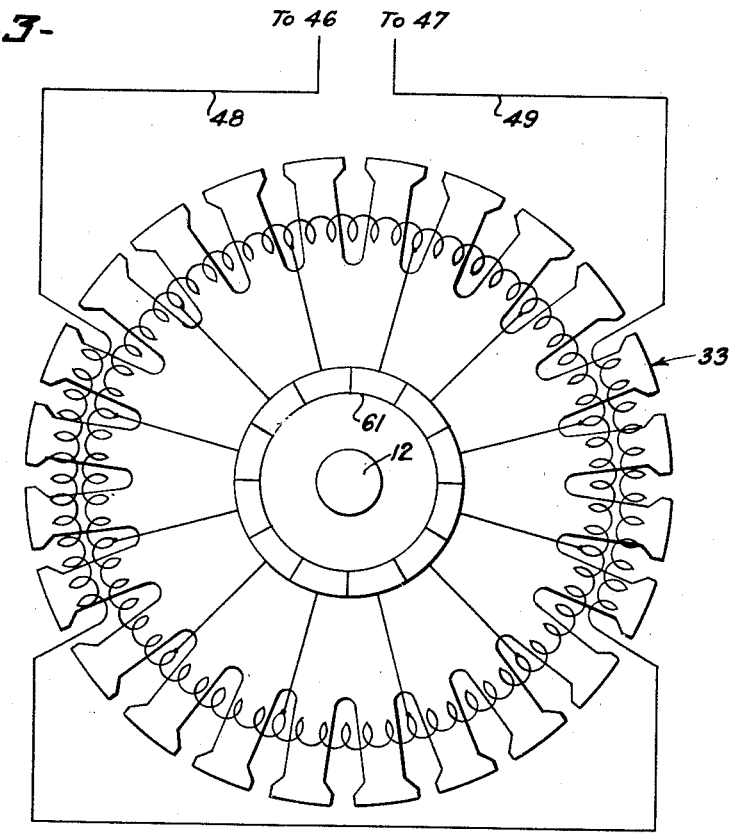
FIG-3-
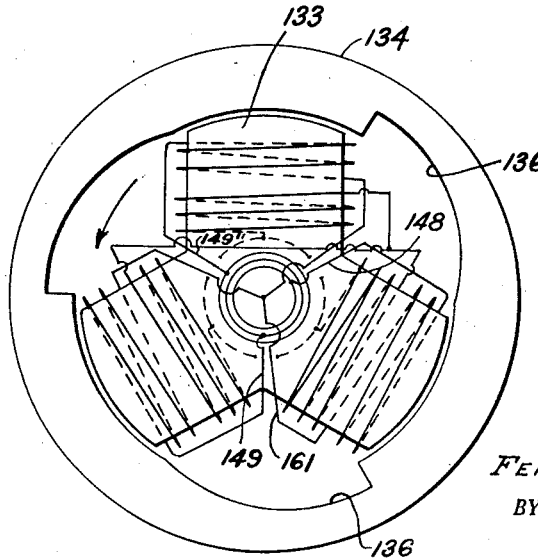
FIG-4-
INVENTOR.
FENTON F. HUTCHINSON
BY
ATTORNEY.

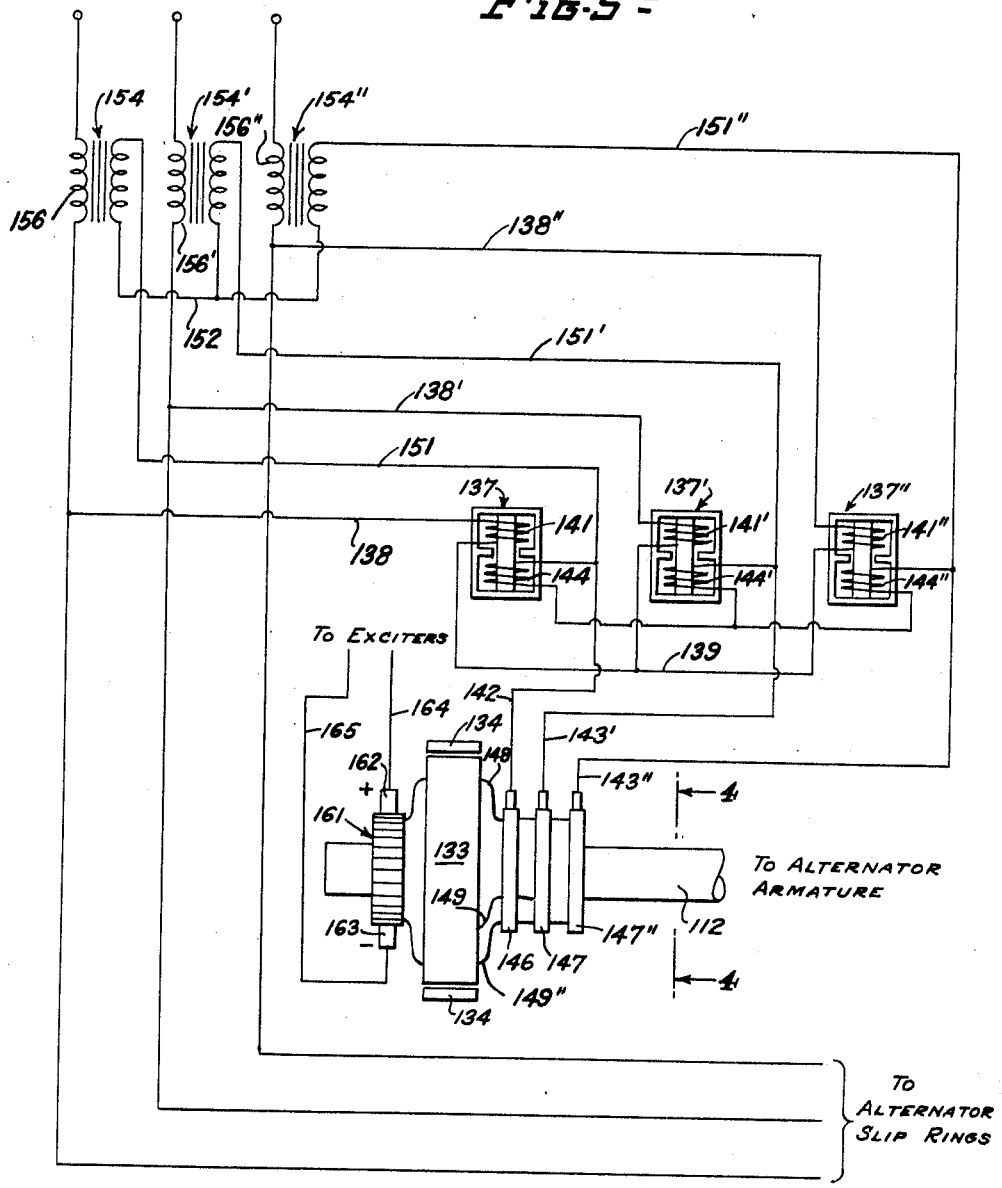

Patented June 1, 1943

2,320,602

UNITED STATES PATENT OFFICE 2,320,602

ALTERNATOR AND CONTROL SYSTEM THEREFOR

Fenton F. Hutchinson, San Francisco, Calif., assignor to Kohler & Chase, San Francisco, Calif., a corporation of California Application June 15, 1940, Serial No. 340,760

3 Claims. (Cl. 171—241)

The invention, in general, relates to alternating current generators. More particularly, the invention relates to an improved means or system effective under variable load conditions as well as under changes in current-voltage phase relationships for maintaining a substantially constant difference of potential either at the brushes of such a generator or at the terminals of the work circuit so that translating devices placed in the work circuits can operate at their maximum effectiveness.

In regulating systems heretofore devised for the maintenance of the generator voltage within a minimum of variation, it has been the practice, in general, to utilize mechanical trips, contact points, variable resistance coils, field magnets in local circuits in combination with commutators in circuit with the armature coils of the generator, as well as many other devices all functioning in the main to vary the exciting current in the field coils of the generator. Some of these systems require the services of attendants, others require additional means for preventing sparking at the commutators, or means for short-circuiting of resistance coils to avoid burning out thereof, and still others require somewhat complex local circuits. In general, these various systems heretofore devised have been somewhat unsatisfactory especially with respect to affording a substantially constant difference of potential at the terminals of the work circuit with the result that translating devices therein can only function far below their maximum efficiencies or capacities. Moreover, these prior systems do not afford accurate over-compounding of the alternator and are limited with respect to over-compounding to conditions whereunder either a resistance or an inductance is present in the work circuit. In other words, none of these prior systems affords accurate over-compounding under varying resistance-reactance ratios.

A primary object of the present invention is to provide an alternator and control system therefor affording automatic compensation for the voltage drop in the load circuit whether due to the presence of a resistance, an inductance, or a combination of resistance and inductive loads, all without the use of mechanical trips, contact points, resistance coils, magnets or other conventional devices.

Another important object of my invention is to provide an alternator and control system therefor of the indicated nature which is additionally characterized by affording an increased voltage at the generator above a predetermined no load value thereby to provide a difference of potential at the terminals of the work circuit of effective value to meet variable load conditions, such as where a combined resistance and inductive load of varying power factor is present in such work circuit, with the result that translating devices may function at their maximum effectiveness.

A still further object of my invention is to provide an improved system for controlling the alternating current voltage at an alternator which coordinates the voltage drop in the work circuit, the current flowing therein, and any changes in phase relationships set up in the circuit.

Another object of my improvement is to provide a relatively simple control system of the aforementioned character which is readily set up and installed, and which requires no attendants, and which can be maintained at a minimum of expense.

The foregoing and other objects are attained, as will appear, in the preferred embodiment of my invention which is illustrated in the accompanying drawings, as well as in the modified embodiment shown for three-phase systems. It is to be understood, however, that I am not to be limited to the precise embodiments depicted, nor to the precise arrangement of the various elements, as my invention, as defined in the appended claims, can be embodied in a plurality and variety of forms.

Referring to the drawings:

Figure 1 is a diagrammatic showing of a preferred embodiment of the invention.

Figure 2 is an enlarged, sectional elevational view of the coupled stator and rotor of the preferred embodiment of my invention, the direct current windings of the rotor being omitted.

Figure 3 is a plan view of the rotor armature with two sets of windings, as applied to the preferred embodiment of the invention.

Figure 4 is a view taken on the line 4—4 of Figure 5 depicting the coupled elements for three-phase systems.

Figure 5 is a diagrammatic showing of a preferred embodiment of my invention as exemplified in a three-phase system.

In its preferred form, the system of my invention preferably comprises, in combination with an alternator and a load circuit supplied thereby, means connected across the load circuit for producing a variable potential under variable loads and power factor of the load circuit, together with means for rectifying said produced variable potential, and means responsive to the rectified variable potential for varying the exciting current of the alternator. Thus, the method of my invention for compensating for the variations of voltage drop in an alternating current system resulting from varying power factor and varying load, preferably comprises the steps of deriving a variable potential from the load circuit supplied by an alternator, rectifying the derived variable potential, and then utilizing the rectified variable potential variably to alter the excitation of the alternator automatically so as to maintain a substantially constant difference of potential at the terminals of the alternator or at the terminals of the load circuit.

In accordance with my improved system, I provide an alternating current generator 11 preferably of the type depicted in Figure 1 of the drawings with its armature mounted upon a driven shaft 12 which may be journaled in standards, not shown, in any suitable manner. The generator 11 includes a plurality of field poles 13 and 14 fixedly supported in the usual manner in opposed relationship; it being understood that any desired number of pairs of field poles may be utilized and that the armature coils of the machine may be wound for single or poly-phase operation. Moreover, it is clear that it is optional as to whether the armature of the generator be mounted for rotation about fixed poles or whether the generator be of the type that the field poles rotate about a fixed armature. Each field pole of the generator 11 is wound with main windings 16 and 17 arranged on the poles adjacent to the armature, as well as auxiliary windings or coils 18 and 19 arranged on the poles remote from the armature, all of which windings may be in the same direction with respect to the poles. The main field coils 16 and 17 of the generator 11 are in circuit with a separate shunt wound primary exciter 21 in accordance with standard practice and a resistance, such as a rheostat 22, is provided for regulating the exciter. Preferably, the exciter 21 is of the conventional type having its armature mounted on a driven shaft 23 and including main field coils 24 as well as auxiliary field coils 25. It is to be understood that the armature of the exciter 21 may be mounted, as well, on driven shaft 12 on which the armature of the alternator 11 is mounted. With the shaft 23 driven at a constant R. P. M., it is clear that a substantially constant voltage direct current is supplied by the exciter 21 to the generator main field coils 16 and 17 and that, accordingly, the generator 11 will produce an alternating current of a desired potential at no load. The alternating current produced by the generator 11 is collected in the customary manner by brushes 26 and 27 bearing upon collecting disks or slip rings 28 and 29, respectively, which are secured to but insulated from the driven shaft 12, having the terminals of the generator armature coils connected therewith. The work circuit of the system includes two mains or legs 31 and 32 which are connected to the collector brushes 26 and 27, respectively, as shown.

In accordance with my invention, I provide means for supplying current of varying magniture to the auxiliary field coils 18 and 19 of the generator 11 in order to compensate for voltage drop in the work or load circuit supplied by the generator whether due to the presence of an inductive, a resistance or a combination of such types of loads and under varying current-voltage phase relationships. My improved system for varying the current flowing in the field coils 18 and 19 of the alternator preferably includes what may be termed a rotary transformer which is connected to the load circuit supplied by alternator 11 and which has an output potential that varies with the load as well as with changes in current-voltage phase relationships in the work circuit. The system also includes a rectifier connected to the output of the rotary transformer, and an auxiliary exciter connected to the rectifier for utilizing the variable, rectified potential produced for variably increasing the excitation of the alternator 11 automatically.

In its preferred form, the variable potential rotary transformer of my improved system comprises a field structure composed of two elements including a rotating element or rotor 33, and a stationary element or stator 34, the latter encircling the rotor in spaced relationship thereto. In accordance with my invention, the rotor 33 is mounted for rotation synchronously with the generator 11 whose supply it is used to control, preferably upon shaft 12 upon which the armature of the generator is mounted. Rotor 33 carries two sets of windings which conveniently may be termed the input or primary windings, and the output or secondary windings. The disposition of the primary and secondary windings upon the core of rotor 33 may be in a number of different ways. Preferably, I dispose the secondary windings about the core as a fully distributed winding of the type generally used in direct current dynamo machinery and preferably also in deepened slots of the core, as fully illustrated in Figure 3 of the drawings. The primary windings of the rotor are so disposed, preferably above the secondary or direct current windings, as to afford and define poles which are equal in number to the poles of the generator 11 which, in the embodiment depicted, is two. The stator 34 is preferably made in ring form and is so mounted on any suitable bracket as to encircle the rotating element or rotor 33 in spaced relationship thereto. Stator 34 carries no windings but is provided on its periphery with a series of spaced notches 36 which increase in depth in the direction of rotation of the rotor 33, all as shown in Figure 2 of the drawings. Thus, the stator 34 is essentially an unwound, salient pole stationary element in that the poles are not sharply salient but taper off gradually. The two elements of this field structure comprising the rotary transformer act together to complete a magnetic circuit, the reluctance of which varies during rotation of the core of the rotor 33 carrying the two sets of windings hereinabove referred to.

The input or primary windings of the rotor 33 is supplied with alternating current from the load or work circuit preferably through a constant current transformer 37 for limiting the magnitude of the current. To this end, a pair of leads 38 and 39 are connected across the load circuit 31, 32, respectively, and to the input or primary 41 of the constant current transformer, and a pair of leads 42, 43 connect the output or secondary 44 of transformer 37 to slip rings 46 and 47, respectively, which are secured to but insulated from shaft 12, and which are connected to the terminals of the primary windings of the rotor 33 by means of leads 48 and 49, respectively. Preferably, the constant current transformer 37 is of the conventional type wherein the two windings 41 and 44 thereof are disposed on a saturated leg with a magnetic shunt including an air gap between primary and secondary. As is well understood, this construction imposes a definite limit to the current which may be withdrawn from the output or secondary 44, so that any attempt to draw current in excess of this limit results merely in the terminal voltage dropping to such an extend that only the limited current flows to the slip rings 46, 47. Connected in parallel with the leads 42 and 43 is another pair of leads 51 and 52 which connect to the secondary 53 of a series transformer 54, the primary 56 of which is connected to the work circuit of the alternator 11 in series with the load. Transformer 54 is so poled that when there is a load current in the work circuit, the resulting potential in the loop comprising the output or secondary 44 of constant current transformer 37 and the secondary 53 of the series transformer 54, is in the same direction as the potential in the constant current transformer output 44, or, in other words, the two potentials in this loop boost. The result of this connection of the series transformer 54 with its primary in series with the load and its secondary 53 in parallel with the output 44 of the constant current transformer 37, of course, varies with the presence or non-presence of a load in the work circuit. When no load is connected to the work circuit, the only potential in the loop is that applied by the constant current transformer 37 and the only current which flows in the loop is magnetizing current supplied by the transformer 37 to the series transformer 54. Since the impedance of the series transformer is high, as viewed from the terminals of its secondary 53, the load imposed on the constant current transformer is small. However, when a load is connected to the work circuit, current flows in the primary 56 of the series transformer setting up an E. M. F. in the secondary 53 thereof which is opposite to the back E. M. F. produced by the magnetizing current from the output or secondary 44 of the constant current transformer 37. Thus, there is permitted to flow in the loop an increased current having a variable magnitude and phase, dependent upon the magnitude and phase of the work circuit current. Or, in other words, the effect of the current in the work circuit is to decrease the impedance of series transformer 54, as viewed from its secondary 53; and the secondary 44 of the constant current transformer, in supplying the current to this decreased impedance, undergoes a terminal voltage drop, the magnitude and phase of which is dependent on the load. The voltage from the output or secondary 44 of the constant current transformer 37, as thus conditioned, is supplied to the slip rings 46 and 47 of the rotary transformer and appears, as further modified by such rotary transformer, across the terminals of the output or secondary winding of the rotor 33.

In accordance with my invention, the output voltage of the rotary transformer is rectified and applied to increase the excitation of the alternator 11. To this end, the terminals of the secondary winding of rotor 33 are preferably connected to the segments of a multi-segment commutator 61, as illustrated in Figure 3 of the drawings, and the voltage, as thus modified by the rotary transformer, is taken off the commutator by brushes 62 and 63, bearing thereon, to appear rectified as a pulsating direct current voltage applied to the leads 64 and 65 connected to the brushes 62 and 63, respectively. It is to be understood, of course, that a conventional two segment commutator with suitable, properly spaced brushes bearing thereon, may be substituted for the multi-segment commutator 61, if desired. The positive brush 62 of rectifying commutator 61 connects through the lead 64 to the positive brush 66 of commutator 67 of the primary exciter 21, as shown. The negative brush 63 of the rectifying commutator 61 connects through the lead 65 to the main field coils 68 of an auxiliary exciter 69, thence through the auxiliary field coils 25 of the primary exciter 21, and thence to the negative brush 70 of primary exciter commutator 67. From the foregoing, it will be clear that the voltage supplied from the work circuit of the alternator 11, transformed by the rotary transformer, and rectified, is in opposition to the voltage from the primary exciter 21, and normally tends to prevent current flow in the circuit containing the field coils 68 and 25 of the two exciters. The designs of the constant current and rotary transformers are such that the average voltage produced at the rectifying commutator 61 is the same as the average voltage at the commutator 67 of the primary exciter 21. The inductance of the circuit connecting the commutators 61 and 67 is high and the time constant of the circuit is so great that the current change in this circuit in a period of one-half cycle of the alternator is negligible and, therefore, no appreciable current flows therein under no load conditions when maximum voltage appears at commutator 67 of the primary exciter 21. When, however, the voltage applied at the slip rings 46 and 47 drops, as a result of a load connected to the work circuit, the bucking potential at the rectifying commutator 61 also drops, and reverse current flows in opposition to the potential supplied by the rotary transformer thereby exciting the fields 68 of the auxiliary exciter 69 and also bringing up the voltage of the primary exciter 21, thus directly increasing the field excitation of the alternator 11. The commutator 71 of the secondary or auxiliary exciter 69 is supplied with brushes 72 and 73, and the circuit can be traced from positive brush 72 through lead 74 to the auxiliary coil 75 of the second exciter, thence through lead 76 to the auxiliary field coils 19 and 18 of the alternator, thence through lead 77 to the auxiliary field 78 of the second exciter 69 and back through lead 79 to the negative brush 73 of the second or auxiliary exciter.

With reference again to the construction and action of the rotary transformer, it will be observed by the schematic showing of Figure 2 of the drawings that a minimum air gap 81 is provided between the rotor 33 and the stator 34 by virtue of the spaced mounting of the stator ring about the rotor. Moreover, that this minimum air gap 81 lies between two, in this case, larger or maximum air gaps 82 which are afforded by the notches 36 in the periphery of the ring or stator. Thus, the minimum air gap 81 merges gradually to a maximum air gap 82 by virtue of the tapering formation of the notches 36, and the stator ring 34 is esentially, as pointed out above, an unwound salient pole stator. Moreover, the rotor and stator together constitute a transformer having a variable air gap (or two air gaps) in its magnetic circuit, and with high leakage between its primary and secondary coils or windings. If the rotor 33 be considered as stationary with the primary windings thereof under the salient pole of the stator 34, i. e., in a position of minimum air gap between rotor and stator, as indicated by the reference letters AA and full line showings of Figure 2, a given flux through the primary coils of the rotor will cause a maximum flux to thread the secondary coil and will lead to a maximum potential from its terminals, or at the commutator 61. If, however, the rotor be turned to an angle such that the primary coils thereof lie adjacent to or beneath the maximum air gap 62 between rotor and stator, as indicated by the reference letters BB and dotted line showings of Figure 2 of the drawings, and the same current be passed through such primary coils, then the flux produced thereby will be much less and its growth and collapse will produce a lower potential across the secondary coil, or at the commutator 61. With the field or rotor moving at synchronous speed with the alternator, however, the amount of flux which threads the secondary coil depends upon the position of the primary coils with respect to the variable air gap between rotor and stator at the instant of peak current. Stating this in another way. If the phase of the alternating current supplied from the alternator work circuit to the primary winding of rotor 33 is such, with respect to the rotation, that maximum coupling exists between the primary and secondary windings at the instant when such current is at maximum value and the reluctance of the magnetic circuit provided between rotor and stator is a minimum, there will be a maximum total change in lines of force threading the secondary of the rotor throughout the cycle, and maximum voltage will exist at the commutator 61. If, however, the maximum current exists when the coupling is less and the reluctance greater, there will be a smaller total change in flux through the secondary winding and a corresponding lower total output voltage.

It will be clear to those skilled in the art that with the rotary transformer and rectifier producing a rectified direct current voltage of the same average value, but opposite in polarity, as that of the main or primary exciter 21, current cannot flow from the exciter through the leads 64 and 65 to the fields 68 of the second or auxiliary exciter 69. Moreover, that this voltage balance will maintain so long as there is no change of potential in the work circuit. However, when a load is connected to the work circuit, and assuming that the primary exciter voltage remains substantially constant, current will flow in the circuit from exciter 21 to the commutator 61 and thence through the main field coils 68 of the secondary exciter 69. The magnitude of the current flowing in this circuit depends, of course, upon the magnitude of potential variation in the work circuit. With current flowing in main field coils 68 of exciter 69, and also in auxiliary coils 25 of the primary exciter 21, not only is the voltage of the exciter 21 brought up to its initial value but the secondary exciter 69 supplies increased current to the auxiliary coils 18 and 19 of the alternator 11. Due to the presence of the rotary transformer in the system, including its notched stator 34, together with the rectifying commutator 61, the magnitude of the current flowing in the auxiliary coils 18 and 19 of the alternator 11 will vary with respect to the types of loads connected to the work circuit supplied by the alternator, such magnitude of current being always sufficient to maintain the voltage at the brushes of the alternator, or the terminals of the work circuit, at a substantially constant value. If current is taken from the alternator armature circuit which does not displace the phase relationship between current and voltage therein to any appreciable extent, such as by the presence of a resistance load, the direct current voltage drop between the windings of rotor 33 will be in direct proportion to the voltage drop in the alternator armature circuit, and the current flowing from the second or auxiliary exciter 69 to the auxiliary coils 18 and 19 of the alternator 11 will effect a voltage rise at the brushes of the generator to compensate for the voltage drop in the line and bring the voltage at the generator back to substantially its no load value, or as near to such value as it is possible to attain. In other words, assuming a condition in the load circuit as will present substantially unity power factor characteristics, the maximum current rise in the primary windings of the rotor 33 will occur, as under no load conditions, with the relationship between the stator 34 and the primary windings of the rotor such as to present the minimum clearance or air gap 81 therebetween; the relative position of the primary windings of the rotor under such load conditions being indicated by the reference letters AA and full line showings of such coils in Figure 2 of the drawings. However, if current is taken from the alternator armature circuit by translating devices which appreciably affect the current-voltage phase relationship, such as an inductive load, causing the current to lag behind the voltage, the increase of or rise in current flowing through the primary windings of rotor 33 will occur when the relationship between the stator 34 and the rotor primary windings is such as to present an increased clearance or gap therebetween. As the current lag increases to a maximum, the maximum current rise in the primary windings of the rotor 33 occurs when the relationship between such windings and stator 34 presents the widest or maximum clearance or air gap 82 therebetween; the relative positions of the primary windings of the rotor to the clearances between the stator and rotor being indicated by the doted line showings of Figure 2 of the drawings, and designated by the reference letters BB.

In other words, as the air gap increases between the rotor primary windings and the stator, the induced voltage in the secondary winding of the rotor 33 is lowered as a direct function of the widening of the air gap, inasmuch as the current supplied to the primary windings of the rotor is limited by the constant current transformer 37, thereby increasing the amount of current that is delivered from the auxiliary or secondary exciter 69 to the fields 18 and 19 of the alternator 11, all in circuit with the rectifier commutator 61 connected to the secondary windings of the rotor. Under inductive loads, the auxiliary exciter 69 is caused to deliver more current to the auxiliary field coils 18 and 19 of the alternator than when the alternator is operated under a resistance load, such result being effected by the provision of the plurality of notches 36, equal in number to the number of field poles of the alternator, in the stator 34 in conjunction with the local circuit described. Hence, the voltage at the terminals of the work circuit is maintained substantially constant regardless of the type of load carried by the alternator.

It is to be observed that considerable degree of compensation of the alternator can be achieved without the use of series transformer 54, such compensation depending upon voltage drop but not on the power factor except as the power factor affects the drop. With series transformer 54 omitted, a mere voltage drop on the current transformer 37 will permit some current to flow in the leads 64 and 65 and, therefore, increase somewhat the excitation on the alternator 11. Thus, the voltage at the terminals of the output of current transformer 37 will tend to rise, but since some voltage drop must be present to initiate this action, it cannot raise the voltage on the alternator to its no-load value. In other words, with series transformer 54 omitted, the effect is similar to that produced in a slightly under-compounded direct current generator. With the series transformer in the circuit, as shown, any desired degree of over-compounding may be achieved so that the potential at the terminals of the work circuit is maintained constant.

Similarly, it is possible to omit current transformer 37 from the circuit and employ the series transformer 54 with the rotary transformer. But, in this case, the terminals must be reversed so that current always flows in secondary or auxiliary exciter 69 except under conditions of maximum load and minimum power factor. Moreover, the auxiliary coils of the two exciters would have to be connected to buck the main field coils thereof, as well as of the alternator 11, and this is not good practice because of instability and possible reversal of main field coils.

Another modification of the illustrated embodiment may comprise a single exciter rather than the dual exciter arrangement which acts, in effect, as an amplifier. In the modified system, the auxiliary coils 18 and 19 of the alternator are connected in the compensating circuit in place of the coils 68 of secondary exciter 69. Since this modified arrangement would require the use of much more energy in the rotary transformer circuit, the former arrangement of dual exciters is much to be preferred to achieve stability and increased sensitivity.

As indicated above, the compensating system of my invention is entirely suitable to poly-phase operations. If the system be fairly well balanced, no changes need be made in the connections shown with the leads 31 and 32 considered merely as one leg and the neutral of a three-phase supply. Or, if a great degree of un-balance exists in, say, a three-phase system, the connections for the series and current transformers circuit may be made as illustrated in Figure 5 of the drawings utilizing three series transformers and three constant current transformers, and feeding three slip rings on the rotary transformer. As hereinafter mentioned, the series and constant current transformers may be connected either in star or in delta, as desired, but for simplicity of showing, I have depicted these transformers connected in star. Moreover, under these circumstances, the rotor of the rotary transformer is wound with a three-phase instead of a single phase primary winding. As before, the primary windings are evenly distributed about the core of the rotor but the notches of the stator are increased to three to be equal to the number of phases times the number of pairs of poles on the alternator, i. e., there must be three notches in the stator and three salient poles thereon where a bi-polar alternator is used in the system. With reference to Figure 5 of the drawings, showing the series and constant current transformers connected in star, it will be noted that the primary coils 141, 141' and 141'' of the current transformers 137, 137' and 137'', respectively, are connected across the three legs of the armature circuit by means of leads 138, 138', 138'' and 139, and that the primary coils 156, 156' and 156'' of series transformers 154, 154' and 154'', respectively, are connected in series with the load. Further, that the secondary coils 153, 153' and 153'' of the series transformers 154, 154' and 154'', respectively, are connected in parallel with the secondary or output coils 144, 144' and 144'', respectively, of the constant current transformers through leads 151, 151', 151'' and the lead 152. The outputs of the three constant current transformers 137, 137' and 137'' are connected through leads 142, 143' and 143'', respectively, to the brushes of slip rings 146, 147 and 147'', respectively, which are secured to but insulated from the driven shaft 112 on which the armature of the alternator is mounted; although such shaft 112 may be driven otherwise so long as it is rotated in synchronism with the rotation of the alternator armature.

As particularly illustrated in Figure 4 of the drawings, the rotor 133 includes a core having three primary windings thereon evenly spaced about the core from one another and with the terminals thereof connected to the slip rings 146, 147, and 147'' through the leads 148, 149 and 149'', the windings being so arranged as to define poles. The core of rotor 133 also carries a secondary winding having its terminals connected to a multi-segment rectifying commutator 161. As with the single phase system, there is a choice as to whether a multi-segment commutator or a simple rectifying commutator 161 be used. With the multi-segment commutator, the output potential approaches constancy, although some variation does exist. The simple commutator in the three-phase system is a three-segment instead of a two segment device and even here the output potential will fluctuate much less widely than in the single phase system. As shown, however, even very large fluctuations of potential can be supported since the current which flows is dependent upon the average potential owing to the large inductance in the circuit containing the leads 164 and 165 from brushes 162, 163, respectively, of the rectifying commutator connecting the two exciters, not shown in Figure 5. As above mentioned, the stator 134 of the rotary transformer structure is provided with three evenly spaced notches 136 in its periphery, instead of two, to afford a three salient pole device where a bi-polar alternator is employed in the system.

It may be observed that either two series transformers can be used with the three constant current transformers in the three-phase system, or vice versa, i. e., three series transformers and two constant current transformers. The rule to be followed for connecting the sets of series and constant current transformers is that if the primary windings of the constant current transformers are connected directly across the phases the secondary coils of one set of transformers must be connected in star, and the secondary coils of the other set must be connected in delta. The delta connection may be either open or closed and it makes no difference which set is connected in which manner if the turn ratio be properly selected, as is well understood in the art. However, it may be noted that connecting the secondary coils of the series transformers in open delta will decrease the load drawn thereby by one-third and will decrease the regulatory effect by the same amount. By connecting the secondary coils of the constant current transformers in open delta, the current to be supplied by each will be increased, and the voltage drop which a given load will produce will increase. Naturally, the changes in potential and current involved by a change from star to delta, or vice-versa, must be taken care of in the design of the system.

An important advantage of the preferred embodiment of my improved compensating system resides in its great flexibility for freedom in engineering design. Practically unlimited variation in design of the stator 34 is possible provided primary conditions are met. Preferably, the maximum air gap 82 is three to four times the minimum air gap 81, but wide deviations from such proportions are possible without impairing the operation of the system. If the ratio between the minimum and maximum air gap of the stator-rotor relationship is low, it is advantageous to have large leakage and to make the current ratio in the series transformer 54 relatively high with respect to the current available from the constant current transformer 37. In applying the invention to alternators and exciters available in the open market, I have found that with the stator 34 provided with notches 36 of the form depicted I have been able to attain practically any degree of compensation desired, as well as reasonably accurate over-compounding, through merely changing the current ratio in the series and constant current transformers. It follows from the foregoing that the output voltage of the alternator may be maintained substantially constant either at the terminals of the alternator or at the terminals of the load circuit, or at any point in the system. While I have set forth a theory of explanation of the results obtained, I do not wish to limit myself to such theory or any particular theory of explanation of such results.

The system of my invention has a definite utility in installations such as farm lighting, and power systems or industrial plants where the magnitude and power factor of the load vary widely. The improvement is applicable, of course, to any case where it is desired to obtain a predetermined regulation curve from an alternating current generator.

It is to be understood that the appended claims are to be accorded a range of equivalents commensurate in scope with the advance made over the prior art.

I claim:

1. A system for automatically compensating for the voltage drop in a load circuit supplied by an alternator as well as for accurate over-compounding of the alternator under varying load conditions in the load circuit, said system comprising a constant current transformer having its primary connected across such load circuit, a series transformer having its primary connecter in series with the load and its secondary connected in parallel with the secondary of said constant current transformer; said constant current and series transformers so connected being adapted to derive a variable potential from such load circuit under variable load conditions, means for rectifying the derived variable potential to produce a direct current voltage of varying magnitude, and means utilizing the variable, rectified potential for variably exciting the alternator automatically in response to variations in load.

2. A system for automatically compensating for the voltage drop in a load circuit supplied by an alternator and for accurate over-compounding of the alternator under varying resistance-reactance ratios in the load circuit, said system comprising a constant current transformer having its primary connected across such load circuit, a series transformer having its primary connected in series with the load and its secondary connected in parallel with the secondary of said constant current transformer; said constant current transformer and series transformer so connected together and in the load circuit acting to derive a potential from such load circuit that varies in magnitude and phase in accordance with the magnitude and phase of the load connected in such load circuit, a rotary transformer comprising a rotor and a stator consisting of a ring having a plurality of notches in its periphery; said stator being supported in spaced relationship to said rotor, and said rotor including a core mounted for rotation synchronously with the rotation of the armature of the alternator, a plurality of primary windings on said core equal in number to the number of pairs of poles of the alternator, a secondary winding on said core of said rotor, means connecting the secondary of said constant current transformer with the primary windings of said rotor core to apply the variable potential derived from such load circuit thereto; said rotor and said stator constituting a magnetic circuit having variable air gaps and effecting a variable potential across the secondary winding of said core responsive to the variation of potential of such load circuit, a rectifying commutator mounted for rotation with said core and connected to said secondary winding of said core; said rectifying commutator being adapted to rectify the variable potential derived from such load circuit as modified by said rotary transformer, and means responsive to the rectified variable potential produced by said commutator for variably exciting the alternator automatically in response to variations in load in such load circuit supplied by the alternator.

3. A system for automatically compensating for the voltage drop in an alternating current load circuit under variable load conditions thereof and for accurately over-compounding an alternator supplying such load circuit to allow translating devices connected therein to operate at their maximum effectiveness regardless of their effect on the power factor value of the load circuit, said system comprising, in combination with an alternator and a load circuit supplied thereby and a load, a constant current transformer having its primary connected across said load circuit, a series transformer having its primary connected to said load circuit and its secondary connected in parallel with the secondary of said constant current transformer; said connected series and constant current transformers acting to derive a potential from said load circuit that varies in magnitude and phase in accordance with the load as well as to limit the magnitude of the current that may be withdrawn therefrom, a rotary transformer comprising a stator and a rotor consisting of a core mounted for rotation synchronously with the rotation of the armature of said alternator, a plurality of primary windings on said core equal in number to the number of pairs of poles on said alternator, and a secondary winding on said core; said stator comprising a ring having a plurality of spaced notches therein equal in number to the number of said primary windings and being mounted in spaced relationship to said rotor, means connecting the output of said constant current transformer to said primary windings of said core to supply alternating current of limited value to said primary windings and to apply thereto a derived variable potential from said load circuit; said rotor and said stator together constituting a magnetic circuit having variable air gaps and acting to induce a variable potential across said secondary winding of said core, means connected to said secondary winding for producing a direct current voltage of varying magnitude, and means connected to said last named means and responsive to said variable direct current voltage for controlling the excitation of said alternator variably and automatically in response to variations of potential in said load circuit.

FENTON F. HUTCHINSON.